United States Patent Office 3,798,199
Patented Mar. 19, 1974

3,798,199
CARBOXYLIC ACID DIHYDRAZIDE POLYMERS
Yuri W. Han, Los Angeles, Calif., assignor to Lockheed Aircraft Corporation, Los Angeles, Calif.
No Drawing. Filed Oct. 5, 1972, Ser. No. 295,160
Int. Cl. C08g 9/06, 5/02
U.S. Cl. 260—49
19 Claims

ABSTRACT OF THE DISCLOSURE

A new class of polymer, namely a carboxylic acid dihydrazide-diol-aldehyde polymer, is prepared by polymerizing a carboxylic acid dihydrazide with a diol and an aldehyde under temperature conditions to form an N-uncyclized polyamic acid. The polyamic acid is then internally N-N cyclized at a higher temperature.

BACKGROUND AND SUMMARY OF THE INVENTION

A significant factor in the operational feasibility of adhesive, sealing and coating materials for high performance aircraft is their oxidative-thermal stability and fuel resistance. Polymers which have been developed in recent years in an attempt to meet these needs include: linear polymers, such as polyphenylene, polyphenylene oxide, aromatic polyamides and polyhydrazides; condensed ring and ladder polymers such as pyromellitic polyimides, polybenzimidazoles and pyromellitic polyimidazopyrrolenes; silicone containing polymers such as polysiloxane, silicone ladder polymers, polysilphenylene and polyaryloxysilane; and phosphorus or boron containing polymers such as polyphosphoroxynitride, boron nitride and carborane.

Patents which are of background interest to the present invention include U.S. Pat. Nos. 2,420,702, 2,453,578, 2,614,917, 2,723,265, 2,725,385, 2,816,897, 3,037,966, 3,093,656, 3,140,299, 3,179,635, 3,182,073, 3,218,334, 3,261,884, 3,299,101, 3,300,420, 3,314,923, 3,317,480, 3,325,421, 3,326,861, 3,341,489, 3,368,928 and 3,442,849. See also Preparation of Aromatic Poly (imide amide) by Terunobu Unishi, Journal of Polymer Science, Part B (1965), pp. 679–683.

Although a few of these polymers have found specialized use as heat and oxidation-resistant materials, their production and application have been limited. Thus, there remains a continued need for polymers having heat and oxidation resistance and which can be used as adhesives, sealants and/or coatings for elevated temperature environments.

The present invention provides a novel polymer having advantageous high temperature and oxidation resistance properties. The polymers are carboxylic acid dihydrazide-diol aldehyde polymers prepared by polymerizing a carboxylic acid dihydrazide with a diol and an aldehyde to form an N-uncyclized polyamic acid which then can be internally N-N cyclized by heating.

Initially, the dihydrazide is prepared by reacting a polycarboxylic acid anhydride with hydrazine at a temperature which is sufficiently low to prevent internal N-N cyclization. Suitable anhydrides are those derived from cyclic, e.g., aromatic, heterocyclic or cycloaliphatic, polycarboxylic acids having three or four carboxylic acid groups, at least two of the groups being on adjacent carbon atoms (ortho), e.g., pyromellitic acid and trimellitic acid. The resultant dihydrazide is then polymerized with a diol. Importantly, an aldehyde is added which permits polymerization to occur at moderate temperatures without internal N-N cyclization. Without the addition of an aldehyde the energy requirement for internal N-N cyclization appears lower than that of the polymer reaction, and chain stopping N-N cyclization occurs which prevents polymerization. Thus, by adding an aldehyde, and by control of the reaction temperature, an uncyclized polyamic acid is formed. Thereafter, the temperature can be raised sufficiently to cause internal N-N-cyclization of the polymer.

DETAILED DESCRIPTION

In exemplary preparation, pyromellitic anhydride is reacted with hydrazine in methanol solvent in accordance with the following equation:

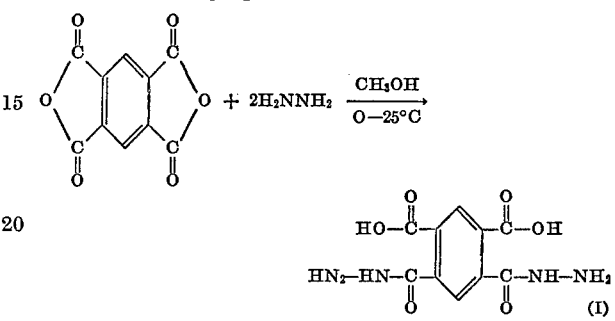

Importantly, the reaction temperature is maintained below 25° C., preferably 0–25° C., to avoid N-N cyclization of the product. Once N-N cyclization forms the more stable aromatic-heterocyclic ring, further polymerization will not take place to any significant extent. N-N cyclization can occur by elimination of water from (I) as well as by rearrangement of pyromellitoyl-N,N-dihydrazide to the N,N'-form, as follows:

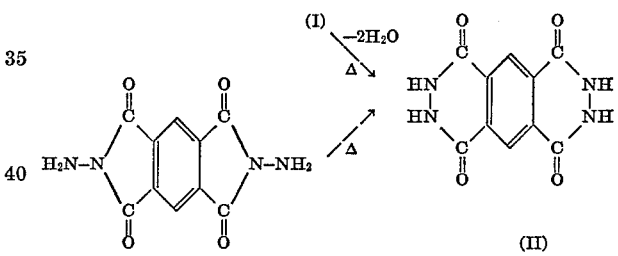

By carrying out the reaction at a temperature below 25° C. in absolute methanol, the reaction to (I) takes place smoothly and the yield is almost quantitative.

In accordance with this invention, polymerization of the pyromellitic dicarboxylic acid dihydrazide (I) with a diol is carried out in the presence of an aldehyde, such as paraformaldehyde, and under controlled temperature conditions. In the absence of the aldehyde, mainly an N-N cyclized pyromellitic dihydrazide monomer (II) is produced and it may be hypothesized that the energy requirement for the N-N cyclization is less than that for the polymerization reaction. While the exact role of the aldehyde and the mechanism of polymerization is not clearly understood, the overall polymerization proceeds, at 95–120° C., by the equation:

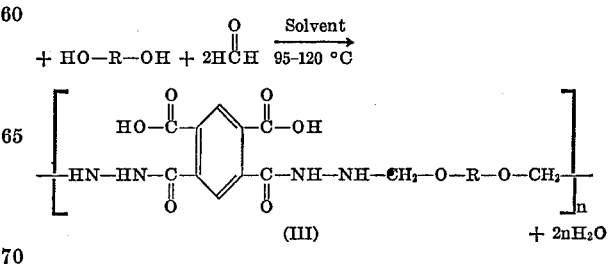

wherein R is an organic diol having at least 2 carbon atoms and $n$ is in the range of about 5 to about 500.

As a final step, polymer III is internally N-N cyclized simply by heating to above 120° C., preferably below 200° C., to yield a fully N-N cyclized pyromellitic dihydrazide-diol-aldehyde polymer, as follows:

III $\xrightarrow{>120°C}$

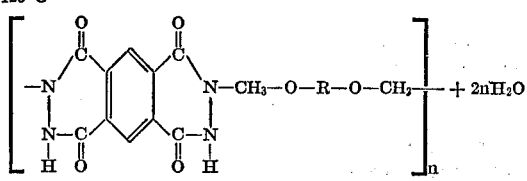

In a similar manner, one can prepare any of a new class of N-N cyclized cyclic carboxylic acid dihydrazide-diol-aldehyde polymers characterized by the repeating unit

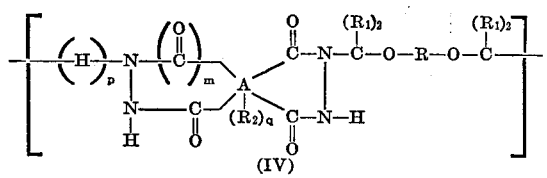

wherein A is a cyclic group, e.g., aromatic, heterocyclic, cycloaliphatic each $R_1$ is an independently selected alkyl radical having 1–5 carbon atoms, R is a divalent organic radical having at least 2 carbon atoms, $m$ and $p$ are interdependently selected from 0 and 1 such that $m$ plus $p$ equals 1, $R_2$ is an electrophilic substituent, and $q$ is selected from 0, 1 and 2 when $m$ is 1 and from 0, 1, 2 and 3 when $m$ is 0. Since the polymers are derived from cyclic polycarboxylic acids in which pairs of carboxylic acid groups are on adjacent carbon atoms, the carboxyl components of the

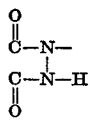

groups, on the cyclic group A, will be on adjacent atoms thereof. The term "N-N cyclized" as first used above refers to the cyclization resulting from linkage of the hydrazide nitrogen atom and not to the cyclic group referred to by the letter A.

By stopping short of the last heating step, one obtains a new class of N-uncyclized cyclic carboxylic acid dihydrazide-diol-aldehyde polymers characterized by the repeating unit

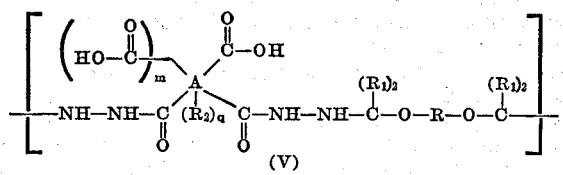

wherein A, $R_1$, $R_2$, $m$ and $q$ are as above given with respect to Formula IV.

The starting compound, for reaction with hydrazine, is a cyclic polycarboxylic acid anhydride derived from a cyclic polycarboxylic acid having 3–4 carboxylic acid groups, at least two of the groups being ortho, or on adjacent carbon atoms, i.e.,

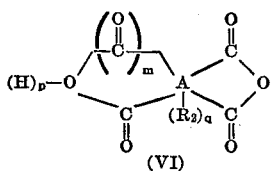

Pyromellitic anhydride and trimellitic anhydride are preferred. Examples of other cyclic dianhydrides include 2,3,6,7-naphthalene tetracarboxylic dianhydride, bis(3,4-dicarboxylphenyl)sulfone dianhydride, bis(3,4 - dicarboxylphenyl)ether dianhydride, pyrazine-2,3-5,6-tetracarboxylic dianhydride, thiophene-2,3,4,5-tetracarboxylic dianhydride, cyclopentane - 1,2,3,4-tetracarboxylic dianhydride, pyrrolidine - 2,3,4,5 - tetracarboxylic dianhydride, phenanthrene - 1,8,9,10-tetracarboxylic dianhydride, and the like. As substituents one can use any electrophilic group such as lower alkyl (e.g., methyl, ethyl, propyl, butyl, pentyl, hexyl and isomeric forms thereof), halogen (e.g., chlorine, bromine, iodine, fluorine), nitro, nitroso, sulfate, hdroxyl, thiol, amino, and the like.

Reaction with hydrazine can be carried out in any common polar solvent. The solvent is preferably a non-solvent for the resultant dihydrazide, for precipitation of the product, but evaporative techniques can also be used. Suitable solvents include alcohols such as methanol, ethanol, and the like, acetone and other ketones such as methyl ethyl ketone, methyl isobutyl ketone and cyclohexanone, and the like, dimethyl sulfoxide, Cellosolve acetate, ethyl acetate, tetrahydrofuran, and the like.

As a diol in the polymerization reaction, one can use any organic diol having at least two carbon atoms. Thus, such diverse diols as 1,5-pentandediol, dihydroxydiphenylsulfone, diethylene glycol, trans 1,4-cyclohexanedimethanol and 2,2,3,3,4,4 - hexafluoro-1,5-pentanediol have all been used with success. Accordingly, the divalent organic radical R, referred to in Formulas III, IV and V, can be chosen from any of the foregoing. Other examples can be obtained by reference to the list of organic radicals contained in columns 5–8, U.S. Pat. 2,413,718 to B. H. Lincoln and G. D. Byrkit, which list is incorporated herein by reference, and the divalent analogous of the radicals there listed are examples herein.

The aldehyde used in the polymerization reaction can be a lower alkyl aldehyde, i.e., with one to five carbon atoms such as formaldehyde, glyoxal, acetaldehyde, propionaldehyde, butyraldehyde, pentaldehyde, glutaraldehyde, and isomers thereof. Paraformaldehyde is preferred.

The dihydrazide, diol and aldehyde are mixed together in a suitable polar solvent and heated under controlled temperature conditions. Alternatively the components are heated without a solvent to effect melt polymerization. In either case, it is important to maintain the temperature of polymerization in the range of 95–120° C. for a time sufficient to effect polymerization, generally at least five minutes. The resulting product is an N-uncyclized polyamic acid which can be further heated at above 120° C., preferably below 200° C., to effect internal N-N cyclization. A convenient procedure for preparing the N-N cyclized polymer is to heat the components continuously from a temperature below 95° C. to a temperature above 120° C., taking at least five minutes to heat from 95° C. to 120° C.

One can use any polar solvent, for the polymerization reaction, in which the components are soluble and preferably which is a solvent for the polymerized product. Suitable solvents include 1-methyl-2-pyrrolidinone, dimethylformamide, dimethylacetamide, dimethylsulfoxide, tetrahydrofuran, and the like. The components are simply added together with the solvent, if used, and heated as above described. Generally, one mole of the diol and at least two moles of aldehyde per mole of dihydrazide are used. It is found that an excess over 2 moles of the aldehyde favors a more complete polymerization at lower temperatures.

The resultant polymerized product is internally N-N cyclized, highly stable to thermal oxidation and fuel resistant. It is capable of cure at reasonable temperatures, i.e., below 200° C. It can be used as an adhesive by direct application of the dissolved product (e.g., 40 weight percent solid) followed by curing at 100–200° C. for several hours. The product can be used to rigidify plastic foam by dipping the foam into the polymer solution (40% solids) and curing at 260° C. for one hour. The rigidified foam can then be used as a high temperature insulator. The same polymer solution can be coated on multiple layers of glass fabric as a laminate, initially impregnated at 125° C. and cured at 125–175° C. for several hours. The same solution can be cast into a rigid film by spraying the solution on a smooth surface, e.g., a glass plate, and evaporating the solvent. The polymer solution can also be applied as a coating and results in high emissivity.

The N-uncyclized polymer can also be obtained by evaporating its solvent under low pressure at a temperature of 120° C. or below, or by melt polymerization, without a solvent, at 95–120° C. The N-uncyclized polymer can be used, dissolved in solvent, in the same manner as described above for the N-N cyclized polymer, but wherein the polymer is cured at a temperature above 125° C.

The following examples, in which all parts are by weight, will further illustrate the invention.

Example 1

Pyromellitic dicarboxylic acid dihydrazide was prepared as follows. A solution of 44 parts of pyromellitic dianhydride in 316 parts of absolute methanol was cooled to 20° C. Four portions of equal amounts of a solution of 15 parts of anhydrous hydrazine (95%) in 32 parts of absolute methanol were added in five minute intervals while keeping the reaction temperature at 15–20° C. with vigorous stirring. A white precipitate was formed immediately after the addition of the hydrazine solution. The reaction conditions were maintained for one hour after addition of the last portion whereupon the mixture was cooled in an ice bath and the precipitate washed with methanol and dried under vacuum for several hours to yield pyromellitic dicarboxylic acid dihydrazide in quantitative amounts.

Example 2

By following the procedure of Example 1, but substituting 38 parts of trimellitic anhydride for the pyromellitic anhydride, one can prepare trimellitic monocarboxylic acid dihydrazide.

Example 3

N-N cyclized pyromellitic dihydrazide-1,5-pentanediol-formaldehyde polymer was prepared as follows. A suspension of 2.0 parts paraformaldehyde (91%) in 3.2 parts 1,5-pentanediol was warmed to 60° C. and cleared by adding a trace of sodium hydroxide. This solution was added to a solution of 8.4 parts of pyromellitic dihydrazide, prepared as in Example 1, in 20 parts of N-methyl pyrrolidinone (1-methyl-2-pyrrolidinone) solvent, and the mixture was heated to 80° C. with stirring and then gradually to 195° C. in a 30 minute period. Undissolved solid was filtered out while the solution was hot and the filtrate was cooled to room temperature to yield 20 parts of a solution of the polymer (theoretical solids of 40%).

Example 4

The procedure of Example 3 can be followed but substituting 7.6 parts of trimellitic dihydrazide, obtained as in Example 2, for the pyromellitic dihydrazide to prepare N-N cyclized trimellitic dihydrazide-1,5-pentanediol-formaldehyde polymer.

Example 5

The procedure of Example 3 can be followed but with heating of the components at 110° C. for 20 minutes to prepare N-uncyclized pyromellitic dihydrazide-1,5-pentanediol polymer. The N-uncyclized polymer can then be heated to 195° C. over a period of 20 minutes to prepare the internally N-N cyclized polymer.

Example 6

N-N cyclized pyromellitic dihydrazide-dihydroxydiphenylsulfone-formaldehyde polymer was prepared as follows. Five parts of dihydroxydiphenylsulfone (obtained from the Ultra Division of Witco Chemical Company), 5.68 parts of pyromellitic dihydrazide, prepared as in Example 1, and 1.4 parts of paraformaldehyde (91%) were mixed thoroughly. To this was added 20 parts of N-methylpyrrolidinone. The mixture was heated gradually from room temperature to 130° C., over a 20 minute period, with stirring whereupon, at 130° C., the mixture became a clear viscous solution. The mixture was kept at 130° C. for 10 minutes to yield 20 parts of a solution of the polymer.

Example 7

N-N cyclized pyromellitic dihydrazide-diethylene glycolformaldehyde polymer was prepared as follows. To 10 parts of N-methylpyrrolidinone solvent were added, with thorough mixing, 5.7 parts of pyromellitic dihydrazide, prepared as in Example 1, 2.1 parts of diethylene glycol and 1.4 parts of paraformaldehyde. The mixture was heated gradually with stirring, over a 30 minute period, from room temperature to 130° C. to yield 15 parts of a solution of the polymer (theoretical solids of 47%).

Example 8

N-N cyclized pyromellitic dihydrazide-1,4-cyclohexanedimethanol-formaldehyde polymer was prepared as follows. To a mixture of 5.7 parts of pyromellitic dihydrazide, prepared as in Example 1, and 1.4 parts of paraformaldehyde were added 2.88 parts of trans-1,4-cyclohexanedimethanol dissolved in 10 parts of hot N-methylpyrrolidinone. The mixture was gradually heated with stirring from room temperature to 130° C. over a 30 minute period to yield 16 parts of a solution of the polymer (theoretical solids of 50%).

Example 9

The procedure of Example 3 was followed except that the mixture was heated gradually to 135° C. while dry nitrogen was bubbled through the reaction mixture. The total reaction time was 1 hour. The product was filtered to remove a small amount of insolubles to yield the N-N cyclized polymer in the filtrate.

Example 10

N-N cyclized pyromellitic dihydrazide-dihydroxyphenylsulfone formaldehyde polymer, without solvent, was prepared as follows. A mixture of 2.9 parts of pyromellitic dihydrazide, prepared as in Example 1, 2.5 parts of dihydroxyphenylsulfone and 0.7 parts of paraformaldehyde were thoroughly stirred and then heated, while stirring, on a hot plate until it became a soft semi-solid paste, yielding 4.6 parts of N-N cyclized polymer. The polymer was found to be soluble in N-methylpyrrolidone, dimethylformamide and dimethylacetamide.

Example 11

The procedure of Example 10 can be repeated but heating the mixture at 105° C. for 30 minutes to obtain an N-uncyclized polymer. The N-uncyclized polymer can then be heated to 150° C. for 30 minutes to obtain the N-N cyclized polymer.

Example 12

The procedure of Example 11 can be repeated except that 2.6 parts of trimellitic dihydrazide can be substituted for the pyromellitic dihydrazide to yield N-uncyclized and then N-N cyclized trimellitic dihydrazide-dihydroxyphenylsulfone polymer.

Example 13

N-N cyclized pyromellitic dihydrazide-2,2,3,3,4,4-hexafluoro-1,5-pentanediol-formaldehyde polymer was prepared as follows. A mixture of 2.8 parts pyromellitic dihydrazide, prepared as in Example 1, 2,2,3,3,4,4-hexafluoro-1,5-pentanediol (obtained from Pierce Chemical Company) and 0.7 parts of paraformaldehyde in 7 parts of N-methylpyrroldinone was heated gradually, with stirring, to 125° C., over a 15 minute period. The product was cooled to room temperature and undissolved solids were filtered out to yield 9.5 parts of the filtrate solution containing the polymer.

Examples 14–19

The procedure of Example 3 can be repeated but in place of the formaldehyde one can use equivalent weight amounts of glyoxal, acetaldehyde, propionaldehyde, butyraldehyde, pentaldehyde or glutaraldehyde to yield the corresponding polymer.

Example 20

A polyimide-amide foam (obtained from the Monsanto Company), measuring 1 cm.$^3$, was dipped into an N-methylpyrrolidinone solution of N-N cyclized pyromellitic dihydrazide-1,5-pentanediolformaldehyde polymer (15% solids) containing 20 weight percent paraformaldehyde (based on the dihydrazide) and then cured at 150° C. for 20 minutes, 210° C. for 1 hour and 260° C. for 1 hour. The resultant foam was very rigid and had a final density of about 7 lbs./ft.$^3$.

Example 21

An N-methylpyrrolidinone solution of N-N cyclized pyromellitic dihydrazide-1,5 - pentanediol-formaldehyde polymer (30% solids) was coated on a titanium surface and the emissivity of the coating was measured at 260° C. The average value of emissivity was 93%.

Example 22

In order to determine the thermal stability of the polymers at high temperature, weight changes in stationary atmospheres at various temperatures were measured as a function of time. Various polymer solutions were spread on glass plates and cured for about 4 hours during which the temperature was raised gradually to 510° F. A rapid decrease in weight was observed during the initial 3.5 hours due to evaporation of the solvent and curing of the polymers. The following table summarizes the results.

| Polymer | Time (hours) | Temp., ° C. | Evaporative percent loss after 3.5 hrs.[1] | Additional wt. loss |
|---|---|---|---|---|
| Example: | | | | |
| 3 | 3.5 | 95–265 | 73.5 | |
|  | 15.5 | 265 | | 3.8 |
|  | 30.5 | 265 | | 6.3 |
| 6 | 3.5 | 95–265 | 67.5 | |
|  | 15.5 | 265 | | 4.7 |
|  | 22.0 | 265 | | 4.7 |
| 7 | 3.5 | 95–265 | 73.0 | |
|  | 15.5 | 265 | | 1.4 |
|  | 22.0 | 265 | | 1.9 |
| 8 | 3.5 | 95–265 | 65.7 | |
|  | 15.5 | 265 | | 3.1 |
|  | 30.5 | 265 | | 6.0 |
| 9 | 3.5 | 95–265 | 89.5 | |
|  | 15.5 | 265 | | 2.5 |
|  | 30.5 | 265 | | 3.2 |

[1] From original weight of solution.

Inspection of the foregoing table demonstrates the low weight loss, hence stability, of the coatings, after initial evaporation of the solvent.

I claim:

1. A process for preparing an N-H cyclized cyclic carboxylic acid dihydrazide-diol polymer, comprising:
    reacting a cyclic polycarboxylic acid dihydrazide in which the carbonyl component of at least one of said carboxylic acid hydrazide groups is on a ring carbon atom and at least one carboxylic acid carbonyl group is on a ring carbon atom adjacent said carbonyl component, with a diol and an aldehyde at a temperature in the range of 95–120° C. to form an uncyclized polyamic acid polymer therefrom; and
    heating said uncyclized polyamic acid at a temperature above 120° C. sufficient to internally N-H cyclize said polyamic acid.

2. The process of claim 1 including adding a polar solvent prior to said polymerization.

3. The process of claim 1 wherein said polymerization and N-N cyclization steps are sequentially obtained by heating the components forming said N-N cyclized polyamic acid from a temperature below 95° C. to a temperature above 120° C., taking at least five minutes to heat from 95° C. to 120° C.

4. The process of claim 1 wherein said dihydrazide is a tetracarboxylic acid dihydrazide.

5. The process of claim 4 wherein said dihydrazide is pyromellitic dicarboxylic acid dihydrazide.

6. The process of claim 1 wherein said diol is selected from the group consisting of 1,5-pentanediol, dihydroxydiphenylsulfone, diethylene glycol, trans-1,4-cyclohexanedimethanol and 2,2,3,3,4,4-hexafluoro-1,5-pentanediol.

7. The process of claim 1 wherein said aldehyde is an alkyl aldehyde having 1–5 carbon atoms.

8. The process of claim 1 wherein said aldehyde is a formaldehyde.

9. The process of claim 8 wherein said dihydrazide is a pyromellitic dicarboxylic acid dihydrazide.

10. The process of claim 9 wherein said diol is selected from the group consisting of 1,5-pentanediol, dihydroxydiphenylsulfone, diethylene glycol, trans - 1,4-cyclohexanedimethanol and 2,2,3,3,4,4 - hexafluoro - 1,5-pentanediol.

11. The process of claim 10 including adding a polar solvent prior to said polymerization.

12. The process of claim 11 wherein said solvent is selected from the group consisting of 1-methyl-2-pyrrolidone, dimethylformamide, dimethylacetamide, dimethylsulfoxide and tetrahydrofuran.

13. The process of claim 1 wherein said dihydrazide is prepared by reacting a cyclic polycarboxylic acid anhydride, with hydrazine at a temperature which is below that required for N-N cyclization of said dihydrazide, said anhydride being derived from a cyclic polycarboxylic acid having at least 3–4 carboxylic acid groups, two of said groups being on adjacent ring carbon atoms.

14. The process of claim 13 wherein said anhydride and said hydrazine are reacted at a temperature in the range of 0–25° C.

15. A process for preparing an N-N cyclized pyromellitic dihydrazide-diol polymer, comprising:
    reacting pyromellitic dianhydride with hydrazine at a temperature in the range of 0–25° C. to form an N-uncyclized pyromellitic dicarboxylic acid dihydrazide;
    polymerizing said dihydrazide with a diol and an aldehyde at a temperature in the range of 95–120° C. to form an N-uncyclized polyamic acid therefrom; and
    heating said N-uncyclized polyamic acid at a temperature above 120° C. to N-N cyclize said polyamic acid.

16. As a new composition of matter, a polymer characterized by the repeating unit

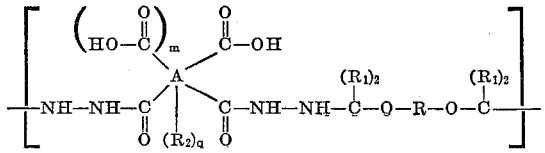

wherein A is a cyclic group in which at least one of the carboxylic groups thereon and the carbonyl component of the

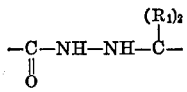

group are on adjacent ring carbon atoms thereof, each $R_1$ is an independently selected alkyl radical having 1–5 carbon atoms, R is a divalent organic radical having at least 2 carbon atoms, $m$ is selected from 0 and 1, $R_2$ is an electrophilic substituent, and $q$ is selected from 0, 1 and 2 when $m$ is 1 and from 0, 1, 2 and 3 when $m$ is 0.

17. As a new composition of matter, a polymer characterized by the repeating unit

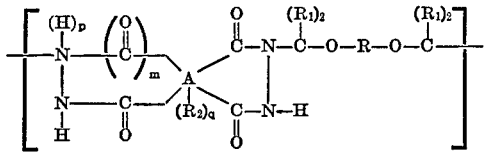

wherein A is a cyclic group in which the carbonyl components of any

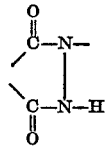

groups thereon are on adjacent ring carbon atoms thereof, each $R_1$ is an independently selected alkyl radical having 1–5 carbon atoms, R is a divalent organic radical having at least 2 carbon atoms, $m$ and $p$ are interdependently selected from 0 and 1 such that $m$ plus $p$ equals 1, $R_2$ is an electrophilic substituent, and $q$ is selected from 0, 1 and 2 when $m$ is 1 and from 0, 1, 2 and 3 when $m$ is 0.

18. The composition of claim 17 wherein said repeating polymer unit is

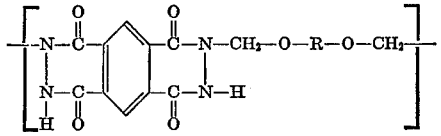

19. The composition of claim 16 wherein said repeating polymer unit is

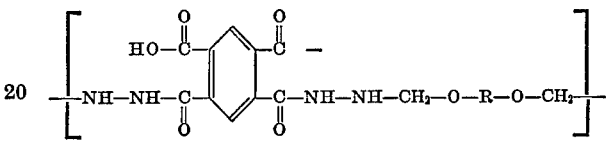

References Cited
UNITED STATES PATENTS

| | | | |
|---|---|---|---|
| 2,865,890 | 12/1958 | Auten | 260—72 S |
| 3,179,634 | 4/1965 | Edwards | 260—78 |
| 3,179,635 | 4/1965 | Frost | 260—78 X |
| 3,299,101 | 1/1967 | Tucker | 260—78 X |

HOWARD E. SCHAIN, Primary Examiner

U.S. Cl. X.R.

117—123 D, 132 BF, 161 LN; 161—198; 260—2.5 F, 30.4 N, 32.8 N, 33.6 R, 33.8 R, 52, 72 R, 72.5